April 21, 1953  T. DE FOREST ET AL  2,635,329
METHOD OF DETECTING CRACKS IN POROUS SURFACES
Filed May 16, 1950
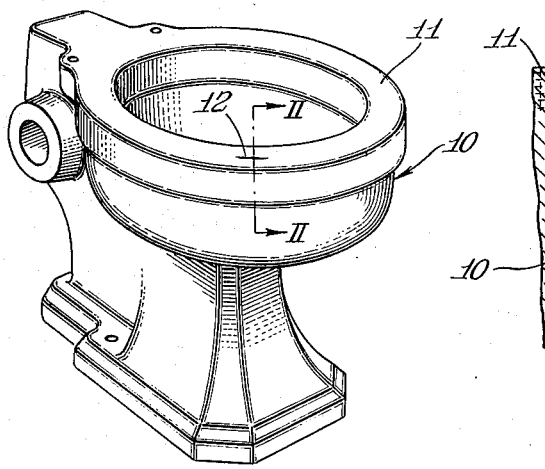
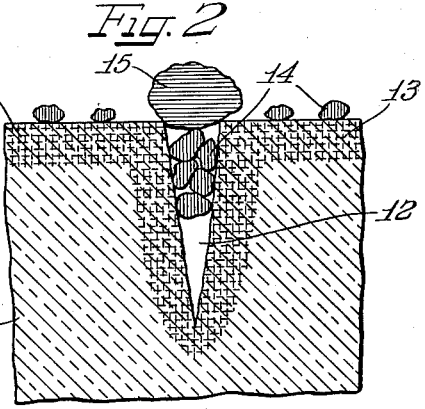
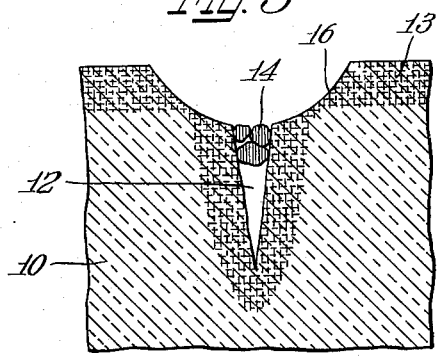
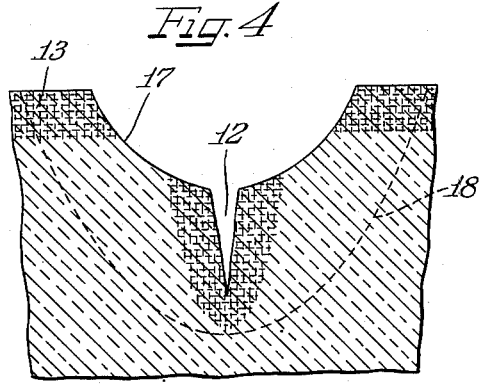
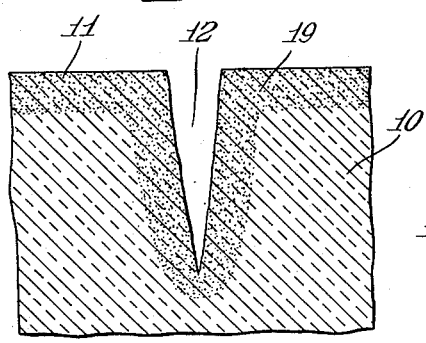
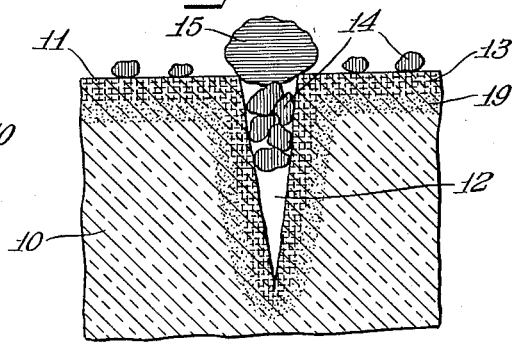
Inventors
Taber de Forest &
Henry N. Staats Patented Apr. 21, 1953

2,635,329

UNITED STATES PATENT OFFICE 2,635,329

METHOD OF DETECTING CRACKS IN POROUS SURFACES

Taber de Forest, Northbrook, and Henry N. Staats, Des Plaines, Ill., assignors to Magnaflux Corporation, Chicago, Ill., a corporation of Delaware Application May 16, 1950, Serial No. 162,214

22 Claims. (Cl. 29—148)

The present invention relates to a method of detecting cracks in porous surfaces, and more particularly to a method for the detection of such cracks by the use of colored or fluorescent material dispersed in a fluid capable of penetrating the porous surface.

This invention is a continuation-in-part of application Serial No. 81,316, filed March 14, 1949, entitled "Method of Detecting Cracks in Porous Surfaces."

The term "porous surface" as herein employed refers to a liquid-permeable surface consisting of a myriad of pores, the surface being capable of serving as a filter to strain suspended discrete particles from suspension in a liquid medium.

In the manufacture of porous articles, and particularly in the manufacture of ceramic objects, it is often impossible visually to locate small cracks or other defects in a porous surface due to the light-dispersive rather than light-reflective nature of the surface. A simple, easily employed method which gives an accurate and positive location of cracks in the surface is greatly desired as an inspection aid in the manufacture of various products such as the manufacture of clayware articles. In the manufacture of such articles, as for instance clayware toilet closets or bowls, component parts of the larger unit are cast, assembled, smoothed off with water or "finished," and then dried to a substantially "bone-dry" condition by air drying for a period ranging from one to five days, and/or dried in drying ovens at moderate temperatures for several hours. A glaze producing coating is then applied to the bone-dry article which is subsequently heated at elevated temperatures in firing kilns to fire the glaze and body.

It has been found that during the drying operation prior to firing, unequal drying strains may develop which produce drying cracks, or "green checks," in the porous surface. These green checks, as produced during the drying, are minute, but open up considerably during the subsequent firing to render the fired article unsuitable for use or sale. If it were possible to locate the defects prior to firing, the cracks could be eliminated or filled with additional clay material so that, upon firing, the finished articles would be free of cracks or other surface defects.

Various inspection methods have heretofore been proposed for the location of cracks in porous surfaces. For example, it has been proposed that unfired ceramic or clayware articles be inspected by the application of a fluid such as water, kerosene or glycerine to the porous surface and observing the coloration which appears at the flaw as a fleeting light or dark spot on the surface. The methods of the prior art give at best only a momentary indication of the location of flaws in the surface and give no hint as to the size or extent of the defect.

The present invention now provides a method whereby cracks or surface defects in porous surfaces may be readily located and the size and extent of the defect ascertained. The defects are positively located on the surface. The surface indication persists indefinitely until removed, while the sub-surface indication may persist for a period of from five to sixty minutes, depending upon the type of material being inspected. Thus, the operator may eliminate defects while having an indication of the location, size and extent thereof.

While our invention is particularly applicable to the inspection of ceramic surfaces, it may be applied to any fired or unfired porous material having a myriad of interconnected pores. Concrete, cement, wood, insulators, resistor tubes, graphite seals and powdered metal compacts, such as unsintered tungsten carbide compacts, are exemplary of unfired non-ceramic materials which may be inspected by the use of the method of the present invention. Fired porous material, such as spongy compacts of sintered metals for bearings, may also be inspected for the determination of surface defects.

The term "porous," as used herein, applies to any body having a surface, or a surface and interior, that is, or are, permeable in a more or less general and uniform manner to low viscosity liquids, such as the liquid penetrants herein referred to.

The present invention comprises the application of a dispersion of a colored material such as a pigment, or a mixture of a dye and pigment, in a penetrating fluid to the porous surface to be inspected. The dye or pigment may be of two general types; either colored for observation under white light such as daylight, or luminescent for observation in the presence of exciting illumination. Preferably, but not necessarily, the coloring material selected should be of such character that it will be dissipated upon heating the articles tested, so as to avoid straining or discoloring the finished articles.

The penetrant or penetrating fluid may be any liquid capable of penetrating the porous surface without harmful effect. We have found that various water-soluble or insoluble polar or non-polar penetrating fluids may be employed. For example, we have found acetone, methyl ethyl ketone, ethanol, isopropanol and glycerol to be suitable water-miscible fluids, while ethyl acetate, butyl acetate, carbon tetrachloride, toluene, xylene, motor lubricating oils (heated to decrease the viscosity), and light petroleum distillates, such as kerosene and petroleum ether, are examples of suitable water-immiscible fluids.

We have found that when a liquid penetrant is placed upon a porous body containing a crack, as by spraying or flooding the surface with the penetrant, the fluid penetrates the surface and is absorbed more rapidly at the crack than at other points upon the surface. This phenomenon is believed to be caused by the fact that the crack, having depth and length, presents an additional porous, under-the-surface area. As the absorption of liquid by porous bodies is roughly proportional to the surface area presented to the liquid, the additional absorption areas presented by the crack will cause more liquid to be absorbed at the defect. Due to the greater absorption of the liquid by the crack, there will be a tendency for the liquid and the pigment dispersed therein to migrate over the surface of the body to the site of the crack. The present invention applies this principle to the inspection of porous surfaces and determines the presence of surface defects by the application of the pigment dispersion to the surface and observing the concentration of pigment to determine the location of the defects.

Thus, a method of inspection of the present invention may be described, in general, as consisting of contacting a porous surface with a pigment dispersed in a penetrating liquid, allowing the liquid to penetrate the porous surface with the preferential absorption of the liquid by any defects in the surface and observing the pigment concentration by means of the contrasting visible color of non-luminescent pigments or by the luminescence of luminescent pigments when subjected to exciting radiation.

We have found that we may employ dyes dispersed in the penetrating liquid as a semi-colloidal dispersion or as a suspension of discrete particles. The term "semi-colloidal dispersion" as used herein refers to a substantially non-settling dispersion of discrete particles in a liquid medium, the particles ranging in size from those capable of passing a 325 mesh sieve to those of true colloidal size, the dispersed particles being of such size as to be filtered from the liquid medium upon the porous surface. In the use of suspensions of discrete pigment particles in a penetrating liquid, the particles will be filtered from their suspension in the penetrant to remain upon the porous surface. In general, we prefer to employ suspended particles which are of greater size than any surface cracks or other defects in the article being inspected. Semi-colloidal particles present in the penetrating liquid as a semi-colloidal dispersion may also be filtered from the penetrant to remain upon the porous surface, although the particles are preferably small enough to enter any cracks in the surface and to become lodged in the cracks beneath the surface.

In employing solutions of dyes in penetrating fluids together with semi-colloidal dyes and/or pigments, we prefer to apply the dispersion to the porous surface by coating, dipping, spraying, flooding or otherwise contacting the surface with the solution.

We may also locate defects in the porous surface by the use of a colorless penetrating fluid containing either colored or luminescent pigment particles with or without semi-colloidal coloring matter in suspension. The suspension of pigment and liquid is applied to the surface by any suitable method and preferential wetting of the defect occurs immediately due to the additional porous under-the-surface area of the crack. The preferential wetting of the defect will cause the suspension to be drawn to the site of the defect so that the absorption of the penetrating liquid by the porous surface will filter out the pigment particles upon the surface in a position adjacent or overlying the crack. Such a concentration of pigment particles at the location of the defect may be determined by visual inspection either under white light or under exciting illumination.

It is also possible to locate surface defects in porous surfaces by the use of colored or luminescent particles of varying particle size. For example, it is possible to employ a penetrating liquid containing a dissolved soluble dye, a second dye present as a semi-colloidal dispersion in the solution, and a pigment dispersed in the solution as discrete particles. The mixture of dyes, or of dyes and pigments, in the penetrating fluid is applied to the surface to be inspected, the soluble dye penetrating the surface with the fluid while the semi-colloidal and pigment particles are filtered out upon the surface, the smaller particles becoming lodged in any cracks present in the surface. The location of any cracks in the surface is first determined by the concentration of pigment particles upon the surface, and the crack thus indicated is partially gouged out until all of the pigment particles are removed. With the removal of the pigment particles, the semi-colloidal particles lodged within the finer portions of the crack will become visible. Gouging is then continued until the coloration of these particles disappears. Following the removal of the semi-colloidal particles lodged in the crack, the soluble dye serves to indicate the extent of the crack. The crack is then further gouged until the coloration of the dye is removed, so that the operator may be sure, if that is desired, that the crack is entirely eliminated. Following this operation, clay in plastic condition may be applied to the gouged crack to fill the same so that upon subsequent firing no surface defects will be present.

We have found that a more sensitive location of surface defects and a substantial saving in penetrant and dye may be effected by pre-wetting the porous surface with a fluid. In bone dry clayware surfaces, for example, the porous surface is so receptive to the penetrating fluid that relatively large amounts of fluid may penetrate the surface so rapidly that the preferential wetting of the defect will be minimized. By lightly sponging water onto the dry surface and allowing the surface to absorb the water for a period of a few seconds, the pores of the surface become more or less saturated and plugged, while any cracks or surface defects remain open. The porous surface will then absorb less of the penetrating fluid, and the fluid and the dye dispersed therein will have more opportunity to migrate to any cracks so that preferential wetting of the cracks may take place. For use with such a pre-wetting step where water is used as the moistening agent, we prefer to employ a water-insoluble or oily penetrant to avoid dilution of the penetrating fluid and to prevent commingling of the indicating fluid and the moistening agent with a consequent reduction in the sensitivity of the defect indication. It will be readily understood that we may employ a water-insoluble penetrating fluid as the pre-wetting agent in conjunction with a subsequently applied water-soluble penetrating agent carrying the dispersed dye material.

It is, therefore, an important object of the present invention to provide a method for the determination of the location and extent of cracks in porous surfaces by applying to the porous surface a dispersion of a pigment in a penetrating liquid, said pigment having a color contrasting with that of the surface, allowing the liquid to penetrate the porous surface and determining the location of cracks in the surface by observing the pigment concentration upon the surface at the defect.

It is another important object of the present invention to provide a method for locating cracks in porous surfaces by the application thereto of a dispersion of a fluorescent pigment in a penetrating liquid, allowing the liquid to penetrate the porous surface, and subjecting the surface to exciting radiation, whereby any concentration of the luminescent pigment at cracks present in the surface may be located.

It is a further object of the present invention to provide a method of detecting cracks in porous surfaces by pre-wetting the surface with water, applying to the surface colored particles of varying particle size dispersed in a penetrating liquid, allowing the liquid and those particles of small size to penetrate the porous surface and any cracks present therein, the cracks presenting additional porous under-the-surface areas which facilitate increased liquid penetration at the cracks, and observing the presence or absence of color concentrations indicating the presence or absence of cracks in the surface.

It is a still further important object of our invention to provide a method of detecting cracks in porous surfaces or articles which is extremely simple, efficient and economical, and which lends itself to use in mass production.

Still another object of this invention is to provide a method of determining cracks in porous surfaces or articles wherein the detecting material may be dissipated in the normal course of production of the articles, thereby avoiding staining thereof.

It is a yet further important object of the present invention to provide a method for the determination of the location of cracks in porous surfaces by applying to the surface a penetrating liquid containing a dye in solution, a second dye as a colloidal dispersion, and a dispersion of discrete pigment particles, allowing the liquid to penetrate the porous surface, observing any concentration of pigment particles upon the surface to indicate the location of cracks therein, removing the pigment particles, observing colloidal particles lodged deeper in the cracks, removing the colloidal particles and determining the depth to which the soluble dye has penetrated to ascertain the extent of such cracks below the surface.

Other and further objects and features of the present invention will become apparent from the following description and appended claims.

An example of the present invention will now be described with special reference to the drawing, in which:

Figure 1 is a perspective view of a dry, unfired toilet bowl having a crack formed in the surface thereof;

Figure 2 is a sectional view taken along the plane II—II of Figure 1, illustrating a method of the present invention wherein a dispersion of a soluble dye, colloidal particles, and suspended particles in a penetrating fluid are applied to the surface of the porous object, with the soluble dye penetrating the surface, the colloidal particles lodged in the crack, and the suspended pigment particles filtered out upon the porous surface;

Figure 3 is a sectional view similar to Figure 2 showing the initial gouging of the crack to a depth sufficient to remove the pigment particles and a portion of the colloidal particles;

Figure 4 is a sectional view similar to Figure 3 illustrating in full lines the further gouging of the crack to a depth sufficient to remove the colloidal particles, and, in dotted lines, the final gouging of the crack to a depth sufficient to eliminate the soluble dye and thus eliminate the crack altogether;

Figure 5 is a sectional view similar to Figure 2 illutrating a modified method of the present invention in which the surface of the object being tested is first pre-wetted; and Figure 6 is a sectional view similar to to Figure 2 illustrating the application of the dispersion of a soluble dye, colloidal particles, and suspended particles in a penetrating fluid to the pre-wetted surface illustrated in Figure 5.

As shown on the drawings:

The method of the present invention, as has been hereinbefore described, may be employed for the location of surface cracks in porous bodies. The method is particularly applicable to the detection of cracks in either fired or unfired porous ceramic or other materials.

In Figure 1, reference numeral 10 refers generally to an unfired ceramic article, such as a toilet bowl, in substantially dry ("bone-dry") condition. The bowl 10 has a crack 12 formed in its porous surface 11, the crack being invisible to the unaided eye due to the diffractive porous surface of the bowl.

As shown in Figures 2, 3 and 4, the location of the crack 12 in the surface 11 may be determined by the method hereinbefore described, namely, by the application of a penetrant fluid having dispersed therein a soluble dye, colloidal particles and suspended particles. As shown in Figure 2, the penetrating liquid and the dye dissolved therein penetrate, as indicated at 13, into the surface of the porous material and into the crack therein. The semi-colloidal particles, as indicated at 14, are initially dispersed in the penetrant, and, following flooding of the surface 11, these particles 14 are preferentially drawn into the crack 12 due to the preferential absorption of the penetrant fluid at the crack because of the additional under-the-surface area presented thereby. Those particles 14 carried by the penetrant, if of a size less than the width of the crack, will enter the crack and will be lodged therein in a position intermediate the depth of the crack. Those particles 14 not entering the crack, but being larger than the pores of the surface, will be filtered out on the surface 12. Since the dispersion also includes suspended pigment particles 15 which are larger than the opening of the crack 12, the pigment particles are filtered out upon the surface 11 of the porous body during the absorption of the dye solution by the surface. Due to the greater absorbing surface presented by the crack, a greater volume of the penetrant containing the dye and pigment particles dispersed therein will be attracted to the crack, and a greater concentration of the dispersed particles will be deposited directly over the crack or closely adjacent thereto. Thus, to determine the position of the crack, the concentration of pigment particles filtered down on the surface adjacent and overlying the crack is observed.

Figures 5 and 6 illustrate a modification of the method of the present invention in which water is lightly sponged onto the dry surface and allowed to be absorbed for a period of a few seconds. As shown in Figure 5, the water will be absorbed by the surface as indicated at 19 and by the side surfaces of the crack in a manner analogous to the absorption of the soluble dye as shown in Figures 2 and 3. Following the application of water and the absorption of the water by the surface, a testing dispersion similar to that hereinbefore described is applied to the pre-wetted surface, as shown in Figure 6. The water will have tended to temporarily saturate or plug the surface pores, but any cracks, being much larger than the pores, are not plugged by the water. The dye solution will penetrate superficially into the porous object as indicated at 13, although not so rapidly nor so deeply as when applied to a dry surface, thus giving the dye solution more opportunity to be attracted by the large absorptive surface presented by the crack. The coloration exhibited by the crack will be more pronounced than that obtained by the method illustrated in Figures 2 and 3 due to the greater migration of the dye solution to the crack and the lesser penetration of the pre-wetted surface by the dye solution. Either fluorescent or non-fluorescent dye solutions may be employed in connection with the pre-moistening of the porous surface.

Following the location of the crack by the application of the dispersion either to the dry surface (Figure 2) or the pre-wetted surface (Figure 6), if the crack is of such magnitude or so situated that it can be advantageously eliminated, it may be gouged out, as shown in Figures 3 and 4. In the initial gouging operation, the particles 15 are removed. Following the removal of the pigment particles 15 from the surface by gouging to a depth such as indicated at 16 (Figure 3), the crack is still made visible by the presence of the semi-colloidal particles 14 within the crack. As the crack is further gouged out to the depth shown at 17 in Figure 4, the particles 14 are removed and the extent of the crack may be followed by the dye coloration surrounding the crack. The gouging operation may be continued to the dotted line 18 until all of the dye coloration is removed, thus insuring complete elimination of the crack. The gouged out portion may then be filled with clay in a plastic condition and later fired to prepare a finished article having no surface defects or cracks formed therein.

Preceding the steps described in connection with Figures 2, 3 and 4, the operator may apply to the surface of the article an amount of water sufficient to limit the extent of penetration of the soluble dye, as illustrated in connection with Figures 5 and 6. The combination with the water barrier step of the other steps described in connection with Figures 2, 3 and 4 provides a practical way of insuring the detection not only of the presence of cracks but also of their extent.

As has been hereinbefore explained, the dyes and pigment particles of the present invention may be of either the fluorescent or non-fluorescent type. By the use of fluorescent pigments it is possible to employ a much lower concentration of pigment inasmuch as an extremely small amount of fluorescent particles may be easily observed under ultra-violet light. We have found that it is possible to employ fluorescent particles in an amount equal to about 10% of that amount of colored dyes necessary to obtain a visual coloration. The advantage of using fluorescent pigments and dyes is immediately obvious since much lower concentrations of dye or pigment can be effectively employed. Furthermore, because of the smaller quantities required, the problem of contamination of the surface and consequent non-adherence of the glaze coating when fluorescent materials are employed is lessened.

As to the particular dyes or pigment particles which may be employed, we have found that the following formulations are particularly suitable for use with the present invention.

As an example of a suitable formulation for use in the method as described in connection with Figures 2-4, inclusive, we prefer to employ the following mixture:

12.00% Turkey red oil (sulfonated castor oil)
00.18% chrysene
00.06% Rhodamine B extra
00.18% 2,7-dimethyl ceroxen
87.58% light petroleum distillate Since the absence of any staining or discoloration of the fired article is important, the dyes and/or pigments selected should be such as will be volatilized or otherwise dissipated upon subsequent firing of the article. The dyes and pigments in the above formulae are of that character.

Other fluorescent pigments such as zinc sulphide may be employed in place of the chrysene, while non-fluorescent pigments such as yellow permanssa, green toner, red permanssa or other non-fluorescent pigments may be employed. Other fluorescent dyes such perylene, or non-fluorescent oil-soluble dyes such as Oil Red EG or an oil-soluble green may be substituted in formulation in place of the 2,7-dimethyl ceroxen. Di(octadecyl carbonic) ester of leuco dimethoxy dibenzanthrone, dinaphthalene oxide or other dyes capable of forming semi-colloidal dispersions in penetrating fluids may be employed in place of Rhodamine B. In the preferred formulation above given, the limits of the pigment may vary from 0.1 to 0.2% and the soluble dye concentration may be similarly varied. The Rhodamine B content may be increased by increasing the sulfonated castor oil content and decreasing the light petroleum distillate in proportion to the increase of sulfonated castor oil.

In place of Turkey red oil, other substances having a mutual solvent effect upon the dyes and penetrant may be used, such as sulfonated petroleum oils, sulfobenzene stearic acid, oleic acid, and the like.

It is to be noted that in the above formulation two differently colored dyes and a pigment are employed. The 2,7-dimethyl ceroxen and chrysene are yellow and bright blue, respectively, under ultra-violet light, while the Rhodamine B is red. Thus, during the chasing of the crack, the operator first removes material from the surface until the blue coloration of the chrysene pigment disappears, at which time the red color of the Rhodamine B will become visible. Following the removal of the red Rhodamine B, the yellow color, due to the presence of 2,7-dimethyl ceroxen, will then be noted, and upon the disappearance of this color the operator is assured that the crack has been completely chased.

In the use of non-fluorescent particles and dyes, it is evident that differently colored dyes can be employed so that the same effect may be obtained during the chasing of the crack.

It should be understood that semi-colloidal dispersions or suspensions of discrete particles of either luminescent or non-luminescent dyes may be employed alone or in combination with each other or with soluble dyes to determine the location and extent of cracks in porous surfaces.

As has been hereinbefore described, it is preferable in many operations to pre-wet the porous surface with a small amount of water prior to the application of the dye dispersion. It is believed that the water functions to partially plug the surface pores. Thus, a smaller amount of fluid is absorbed by the surface, and the surface will stay flooded longer to allow the particles more time to be attracted to the site of the defect. Clayware which is bone-dry, will readily absorb the penetrating fluid. We have found that if the bone-dry surface is pre-wetter with water, a substantial saving in the amount of treating fluid employed may be effected with an increase in the amount of coloration obtained at the defect. For example, it has been found that when bone-dry ware is pre-wetted with water for periods of time not exceeding twelve seconds the amount of inspection fluid required may be cut from about 3 to 4% by weight to less than 1% of the weight of the porous article. Further, absorption of less treating fluid decreases the possibility of contamination of the kiln atmosphere upon the evaporation of the penetrant during the firing of the treated material. Also, it may be desirable to remove all of the penetrant before firing to completely eliminate the possibility of contaminating the kiln atmosphere. We have found that water used in the pre-wetting step is an aid in driving off the distillate. For example, a bone-dry piece of ware which is inspected for defects will require approximately 50 minutes to remove all traces of the penetrating fluid. The same piece of ware which has been pre-wetted and made to absorb the same amount of penetrant during inspection could be made free of penetrant after drying for a period of from 20 to 25 minutes. If the surface is pre-wetted with water, we prefer to use a water-immiscible penetrating fluid such as a light petroleum distillate, toluene, and the like. It is also possible to pre-wet the porous surface with a water-immiscible liquid, in which case a water-miscible penetrating fluid such as acetone, ethanol, or the like, is employed. In either case, the pre-wetting agent and penetrant are immiscible.

As an example, of a non-aqueous but water-miscible penetrant composition, the following may be given:

0.20% chrysene
0.25% Rhodamine B extra
99.55% acetone

In addition, aqueous penetrant compositions such as the following may be used:

0.60% $CaCO_3$
0.01% alkynaphthalene-sodium sulfonate
0.60% fluorescein-sodium (uranine yellow)
98.79% water Other wetting agents than alkylnaphthalene sodium sulfonate may be used.

As to the chemical structural formulae of some of the dyes and pigments referred to herein, the following are believed to be correct:

Chrysene: oil-soluble, bright blue under ultra-violet.

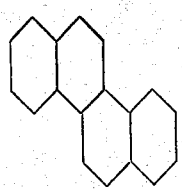

Celitone Brilliant: oil-soluble, yellowish under ultra-violet.

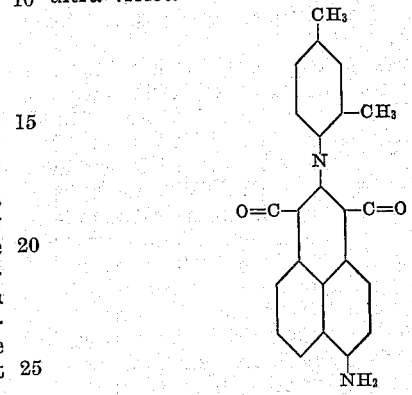

Oil-soluble dyes:

1.

2.

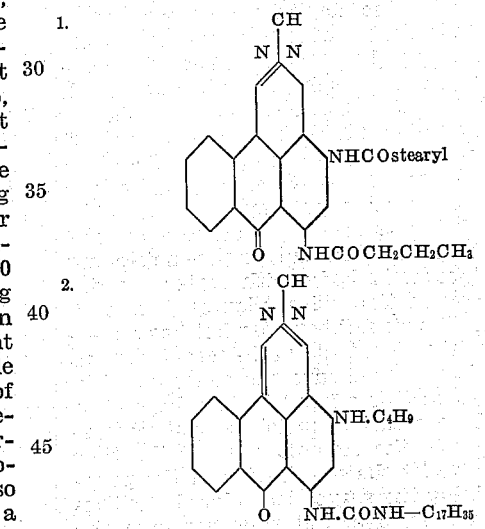

Lumogen fluorescent pigments:

3.

4.

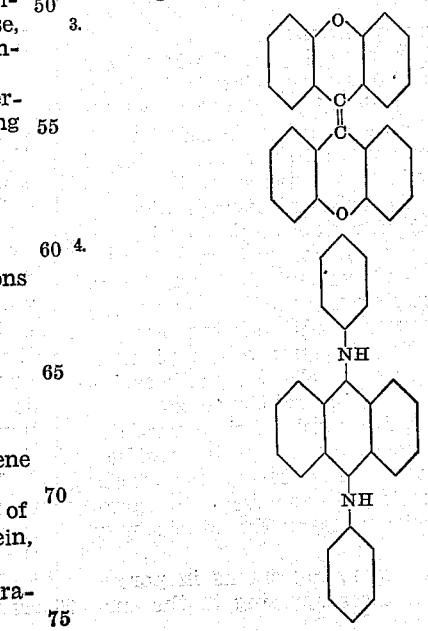

In place of 2,7-dimethyl ceroxen, N-butyl-4-butylamino naphthalimide may be used in the same concentrations and combinations as a yellow fluorescent, oil-soluble dye. Perylene is slightly oil-soluble and is yellow under ultraviolet.

Unless otherwise stated herein, percentages given are percentages by weight.

It will be understood that modifications and variations may be effected without departing from the scope of the novel concepts of the present invention.

In place of the pigment particles herein referred to, we may use pigment compositions such as disclosed in the Switzer et al. Patent No. 2,498,592. The pigment compositions of that patent are daylight fluorescent materials which consist essentially of a dye exhibiting daylight fluorescence when in dilute solution and a pulverized, transparent thermo-set resin carrier solid in which the dye is solvated. The dye retains its daylight fluorescence when solvated in the carrier. Ultraviolet light may, however, be used in inspecting a surface treated with suspensions of these daylight fluorescent materials, the same as in the case of other fluorescent pigments such as have been referred to herein. The particle sizes of the daylight fluorescent materials, as in the case of other pigments mentioned herein, whether fluorescent or non-fluorescent, are generally such that substantially all of them will pass a 325 mesh screen although some may be so large as to be retained on a 325 mesh screen (reference being made to standard U. S. screen meshes). Depending upon the widths of the cracks that may be anticipated, larger or smaller particle sizes can be employed.

In some instances, instead of pre-moistening the unfired ceramic body with water, as described in connection with Figures 5 and 6, "green" ware that is not bone dry but has an appreciable moisture content can be tested without pre-moistening and yet give the effect noted in connection with Figures 5 and 6. In other words, there may be a sufficient moisture content normally present in the ceramic ware at the time of testing to resist the penetration of the penetrant containing the suspended colored particles and the dissolved dye and thus conserve the amount of penetrant necessary to carry out the test procedure.

We claim as our invention:

1. The method of removing cracks in porous surfaces, which comprises applying to the surface a mixture of a liquid penetrant, a soluble dye dissolved in the penetrant, a second dye dispersed in the penetrant to form a semi-colloidal dispersion, and a pigment dispersed in the penetrant to form a suspension of discrete pigment particles, allowing the penetrant solution to penetrate said porous surface to leave said pigment on the surface concentrated about any crack therein, detecting any particle concentration, gouging the surface adjacent the pigment particle concentration to remove the pigment therefrom, detecting any colloidal particles lying in said cracks, gouging said surface a second time to remove any semi-colloidal particles lodged in said cracks, detecting the residual soluble dye in the wall surfaces of the cracks and gouging the surface to remove any coloration from the cracks whereby the cracks may be eliminated.

2. The method of removing cracks in porous surfaces, which comprises applying to the surface a penetrating oil containing an oil-soluble dye dissolved therein, a second dye dispersed in the penetrant as a semi-colloidal dispersion having a particle size less than the size of the cracks to be detected, and a pigment dispersed in the penetrant as a suspension of discrete pigment particles having a particle size greater than the size of the crack to be detected, causing the penetrant and soluble dye to penetrate said porous surface and the semi-colloidal particles to enter said crack, the pigment being concentrated on the surface about any crack therein by the filtration of the penetrant solution therethrough, detecting any particle concentration on said surface, gouging to remove the concentration of pigment particles, detecting any semi-colloidal particles lodged in the cracks, gouging the crack to remove semi-colloidal particles lodged in the crack, detecting any residual soluble dye present on the walls of the crack and gouging to remove any dy coloration whereby the crack may be completely eliminated.

3. The method of detecting cracks in porous surfaces, which comprises applying to the surface a mixture of a liquid penetrant, a soluble dye dissolved in the penetrant, a second dye dispersed in the penetrant to form a semi-colloidal dispersion, and a pigment dispersed in the penetrant to form a suspension of discrete pigment particles, allowing the penetrant solution to penetrate the porous surface to leave said pigment on the surface concentrated about any crack therein, detecting any concentration of pigment particles on the surface to determine the location of any cracks therein, and detecting any concentration of semi-colloidal particles and any soluble dye coloration in said crack to determine the extent of said crack.

4. The method of detecting cracks in porous surfaces, which comprises applying to the surface a mixture of a liquid penetrant, a soluble dye dissolved in said penetrant, a second dye dispersed in said penetrant to form a semi-colloidal dispersion, and a pigment dispersed in the penetrant to form a suspension of discrete pigment particles, said soluble dye and said pigment particles having a coloration different from that of said second dye, allowing the penetrant solution to penetrate said porous surface to leave said pigment on the surface concentrated about any crack therein to lodge said semi-colloidal particles in any crack in the surface and to allow said soluble dye to penetrate said crack to outline the extent thereof, and detecting the presence of any concentration of said differently colored pigment particles, semi-colloidal dye particles and soluble dye to determine the location and extent of said cracks.

5. The method of removing cracks in porous surfaces, which comprises applying to the surface a penetrating oil containing an oil-soluble fluorescent dye dissolved therein, a second fluorescent dye dispersed in the penetrant as a semi-colloidal dispersion having a particle size less than the size of the cracks to be detected, and a fluorescent pigment dispersed in the penetrant as a suspension of discrete pigment particles having a particle size greater than the size of the cracks to be detected, said oil-soluble dye and said dispersed pigment having a coloration under exciting illumination different from that of said second dye, allowing the penetrant and the soluble dye to penetrate said porous surface and the semi-colloidal particles to enter said cracks, said pigment being concentrated on the surface about any crack therein by the filtration of the penetrant solution therethrough, subjecting said surface to exciting illumination, detecting any particle concentration on said surface, gouging to remove the concentration of pigment particles, detecting any semi-colloidal particles lodged in the cracks, gouging the crack to remove semi-colloidal particles lodged in the crack, detecting any residual soluble dye present on the walls of the crack and gouging to remove any dye coloration whereby the crack may be completely eliminated.

6. The method of detecting cracks in porous surfaces, which comprises applying to the surface a penetrating oil containing an oil-soluble dye dissolved therein, a second dye dispersed in the penetrant as a semi-colloidal dispersion having a particle size less than the size of the cracks to be detected, and a pigment dispersed in the penetrant as a suspension of discrete pigment particles having a particle size greater than the size of the crack to be detected, said pigment particle and said oil-soluble dye having a coloration different from that of said second dye, causing the penetrant and soluble dye to penetrate said porous surface and the semi-colloidal particles to enter said crack, the pigment being concentrated on the surface about any crack therein by the filtration of the penetrant solution therethrough, detecting any particle concentration on said surface, detecting any semi-colloidal particles lodged in the crack, and detecting any residual soluble dye present on the walls of the crack to determine the location and extent of said crack.

7. The method of detecting cracks in porous surfaces, which comprises applying to the surface a penetrating oil containing a fluorescent oil-soluble dye dissolved therein, a second fluorescent dye dispsersed in the penetrant as as a semi-colloidal dispersion having a particle size less than the size of the cracks to be detected, and a fluorescent pigment dispersed in the penetrant as a suspension of discrete pigment particles having a particle size greater than the size of the crack to be detected, said fluorescent pigment and said fluorescent oil-soluble dye having a coloration under exciting illumination different from that of said second fluorescent dye, causing the penetrant and soluble dye to penetrate said porous surface and the semi-colloidal particles to enter said crack, the pigment being concentrated on the surface about any crack therein by the filtration of the penetrant solution therethrough, subjecting said surface to exciting illumination, detecting any particle concentration on said surface, detecting any semi-colloidal particles lodged in the crack, and detecting any residual soluble dye present on the walls of said crack to determine the location and extent of said crack.

8. The method of detecting cracks in porous surfaces, which comprises applying to the surface an amount of water capable of being absorbed by the surface, subsequently applying to the moist surface a suspension of discrete particles of a pigment and a penetrating oil, allowing a portion of the oil to penetrate the moist surface, and observing any concentration of pigment particles adjacent any cracks in said surface to determine the location thereof.

9. The method of detecting cracks in porous surfaces, which comprises applying to the surface an amount of water capable of being absorbed by the surface, subsequently applying to the moistened surface a dispersion of discrete, fluorescent pigment particles dispersed in a penetrating oil, allowing said oil to penetrate the porous surface, subjecting the surface to exciting illumination and observing any concentration of fluorescent particles adjacent any cracks to determine the location thereof.

10. The method of detecting cracks in porous surfaces, which comprises applying to the surface an amount of water capable of being absorbed by the surface, subsequently applying to the moistened surface a penetrating oil containing an oil-soluble dye dissolved therein, a second dye dispersed in the penetrant as a semi-colloidal dispersion having a particle size less than the size of the cracks to be detected, and a pigment dispersed in the penetrant as a suspension of discrete pigment particles having a particle size greater than the size of the cracks to be detected, said oil-soluble dye and said pigment particles having a coloration different from that of said second dye, causing the penetrant and soluble dye to penetrate said porous surface and the semi-collodial particles to enter said cracks, the pigment being concentrated on the surface about any crack therein by filtration of the penetrant solution therethrough, detecting any particle concentration on said surface, detecting the presence of any semi-colloidal particles lodged in the cracks, and detecting any residual soluble dye present on the walls of the crack whereby the location and extent of cracks may be determined.

11. A composition for the detection of cracks in porous surfaces, which comprises an oily liquid capable of penetrating said porous surface, a fluorescent dye dissolved in said liquid, a second fluorescent dye which is oil insoluble dispersed in said penetrating liquid as a semi-colloidal dispersion, and a fluorescent pigment dispersed in the penetrating liquid as a suspension of discrete pigment particles having a particle size of 325 mesh and smaller, said dyes and pigment being present in amounts up to 0.2% each by weight of said composition.

12. A composition for the detection of cracks in porous surfaces, which comprises a penetrating oil; an oil-soluble fluorescent dye of the class consisting of 2,7 dimethyl ceroxen, perylene and N-butyl-4-butylamino naphthalimide dissolved in said oil; an oil-insoluble fluorescent dye of the class consisting of Rhodamine B, Di (octadecyl carbonic) ester of leuco dimethoxy dibenzanthrone, and dinaphthalene oxide dispersed in said oil as a semi-colloidal dispersion; and a fluorescent pigment dispersed in the oil as a suspension of discrete pigment particles having a particle size of 325 mesh and smaller, said dyes and pigment being present in amounts up to 0.2% each by weight of said composition.

13. A composition as claimed in claim 11 wherein the pigment is chrysene.

14. A composition as claimed in claim 11 wherein the dissolved dye is 2,7-dimethyl ceroxen.

15. A composition has claimed in claim 11 wherein the dispersed oil-insoluble dye is Rhodamine B.

16. A composition for the detection of cracks in porous surfaces, which has the following formulation:

12% sufonated castor oil,
0.18% chrysene,
0.06% Rhodamine B, 0.18% 2,7-dimethyl ceroxen,
remainder: light petroleum distillate.

17. The method of removing cracks in a porous surface, which comprises applying to such surface a penetrating liquid containing a dissolved dye and a pigment dispersed in said liquid in the form of particles of larger size than the width of any crack present in such surface, allowing the liquid to penetrate the porous surface generally, observing any concentration of pigment particles upon said surface indicating the presence of a crack therein, and gouging to the depth of the penetration of said dye to eliminate said crack.

18. The method of detecting cracks in a porous surface, which comprises applying to such surface an amount of a penetrating liquid capable of being absorbed by the surface, subsequently applying to the moist surface a second penetrating liquid immiscible with said first penetrating liquid containing a soluble dye and a colloidal dye dispersed in said liquid in the form of particles of smaller size than the width of any crack present in such surface, allowing the second liquid and the dyes dispersed therein to penetrate the porous surface generally, and observing any residual soluble dye concentration upon said surface and any colloidal dye concentration in said cracks.

19. The method of detecting cracks in a porous surface, which comprises applying to such surface a penetrating liquid containing a soluble dye and a colloidal dye dispersed in said liquid in the form of particles of smaller size than the width of any crack present in such surface, allowing the liquid and the dyes dispersed therein to penetrate the porous surface generally, and observing any residual soluble dye concentration upon said surface and any colloidal dye concentration in said cracks indicating the presence of cracks therein.

20. The method of detecting cracks in a porous surface, which comprises applying to such surface an amount of a penetrating liquid capable of being absorbed by the surface, subsequently applying to the moist surface a penetrating liquid containing a semi-colloidal dye and a pigment dispersed in said liquid in the form of particles of larger size than the width of any crack present in such surface, allowing the liquid to penetrate the porous surface generally, and observing any concentration of colored particles upon said surface indicating the presence of cracks therein.

21. The method of detecting cracks in a porous surface, which comprises applying to such surface an amount of a penetrating liquid capable of being absorbed by the surface, subsequently applying to the moist surface a second penetrating liquid immiscible in said first penetrating liquid and containing a dissolved dye and a pigment dispersed in said liquid in the form of particles of larger size than the width of any crack present in such surface, allowing said second liquid to penetrate the porous surface generally, and observing any concentration of pigment particles upon said surface indicating the presence of cracks therein.

22. The method of detecting cracks in a porous surface which comprises applying to such surface an amount of a penetrating liquid capable of being absorbed by the surface, subsequently applying to the moist surface a second penetrating liquid immiscible in said first penetrating liquid and having dispersed therein a colloidal dye having a particle size such that the dye will be filtered from said liquid on said surface but capable of entering any cracks therein, allowing said second liquid to penetrate said surface generally with preferential penetration occuring at any cracks, and observing any concentration of colloidal dye upon said surface indicating the presence of cracks therein.

TABER DE FOREST.
HENRY N. STAATS.

References Cited in the file of this patent

UNITED STATES PATENTS

| Number | Name | Date |
|---|---|---|
| 2,259,400 | Switzer | Oct. 14, 1941 |
| 2,340,940 | De Forest | Feb. 8, 1944 |
| 2,405,078 | Ward | July 30, 1946 |
| 2,420,646 | Bloom, Jr. et al. | May 20, 1947 |
| 2,449,274 | Broll | Sept. 14, 1948 |
| 2,470,341 | Darrah | May 17, 1949 |
| 2,516,857 | De Forest et al. | Aug. 1, 1950 |

OTHER REFERENCES

Fluorescent Penetrant Inspection by G. Ellis Steel, Oct. 16, 1944, pp. 100–102.